(12) United States Patent  
Salmonsen

(10) Patent No.: US 6,357,148 B1  
(45) Date of Patent: Mar. 19, 2002

(54) DOUBLE SHOVEL

(76) Inventor: David Salmonsen, 7160 St. Croix Trail, Hastings, MN (US) 55033

( * ) Notice: Subject to any disclaimer, the term of this patent is extended or adjusted under 35 U.S.C. 154(b) by 0 days.

(21) Appl. No.: 09/819,467

(22) Filed: Mar. 29, 2001

(51) Int. Cl.$^7$ .............................. E01H 5/02; A01B 1/22; B25G 3/12
(52) U.S. Cl. ......................... 37/285; 37/266; 16/111.1; 294/54.5
(58) Field of Search ................................ 294/53.5, 54.5; 37/285, 265, 266, 278; 16/110.1, 111.1

(56) References Cited

U.S. PATENT DOCUMENTS

| | | | |
|---|---|---|---|
| 1,191,810 A | * | 7/1916 | Miller |
| 1,810,026 A | * | 6/1931 | Moller |
| 2,098,609 A | * | 11/1937 | Bishop ........................ 306/13 |
| 3,473,838 A | * | 10/1969 | Rankin ........................ 294/53.5 |
| RE32,948 E | * | 6/1989 | Lapshansky .................. 294/51 |
| 5,630,633 A | * | 5/1997 | Dupre et al. ................ 294/53.5 |
| 5,727,829 A | * | 3/1998 | Bellichak ..................... 294/51 |
| 5,956,873 A | * | 9/1999 | Hess ............................ 37/265 |
| 6,237,258 B1 | * | 5/2001 | Biro ............................. 37/285 |

* cited by examiner

Primary Examiner—Christopher J. Novosad  
(74) Attorney, Agent, or Firm—Thomas B. Tate

(57) ABSTRACT

A double shovel for shoveling snow. The blade has a sharp top edge and a sharp bottom edge suitable for shoveling snow, so that when the bottom edge is worn out, the blade can be turned upside-down so that the edge which was originally the top edge can now be used for shoveling.

1 Claim, 1 Drawing Sheet

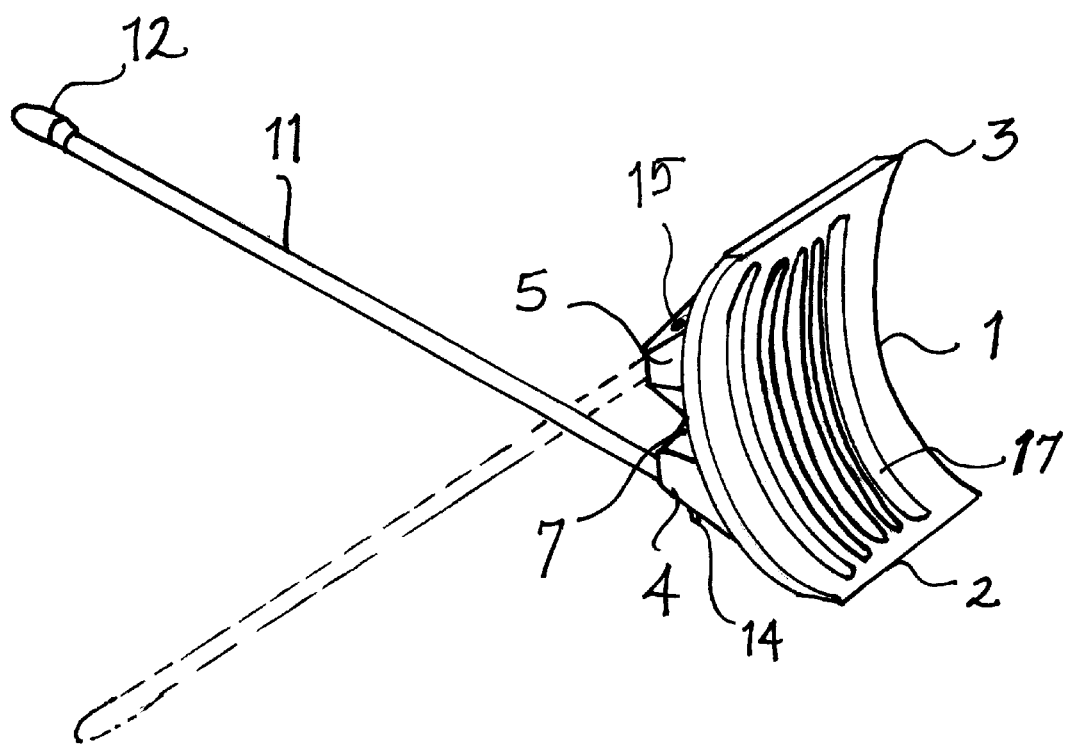

DOUBLE SHOVEL

BACKGROUND OF THE INVENTION

Snow shovels currently on the market have a blade with a sharp bottom edge which is used to scoop and/or push snow. When this edge is damaged or worn out, the shovel is no longer usable.

SUMMARY OF THE INVENTION

The invention is a double shovel; that is, both the top and bottom edges of the blade are suitable for shoveling snow. When the original bottom edge wears out, the blade can be turned upside-down so that the original top edge becomes the bottom edge and now can be used for shoveling. The blade is provided with two sockets to receive the handle, so that the handle can be in a different position depending on which blade edge is being used.

An advantage of the invention is that the shovel can be used for a longer period of time before it wears out. Essentially, the customer gets two shovels for the price of one.

Another advantage is that the shovel is well-suited for pushing snow (although it can be used for scooping also), and therefore causes less strain on the user's back.

DESCRIPTION OF THE DRAWING

The FIGURE is a side perspective view.

DETAILED DESCRIPTION OF THE INVENTION

The invention is a double shovel. The blade 1 has a bottom edge 2 and a top edge 3, both of which are sufficiently sharp to be used for shoveling snow. The blade 1 is curved into a generally arcuate shape as shown in the FIGURE. If the blade were too straight, it would be difficult to push the snow ahead like a plow, and if the blade were too curved (that is, a half-circle shape), it would also be difficult to push the snow forward because the snow would pile up directly in front of the blade and would be too heavy. Therefore the optimum curvature lies in the intermediate range between these two extremes. The blade 1 is generally rectangular with the width being greater than the height (optimally about twenty-six inches wide by about fourteen inches high). The top and bottom edges 2 and 3 each provide a cutting edge about three to four inches high. The blade 1 preferably has ridges 17 to make the shovel more rigid.

A pair of sockets 4 and 5 are formed as projections from the back side of the blade 1. A pair of braces 7 connect the sockets 4 and 5 to each other; braces 7 also are connected to the back of the blade 1. The back of blade 1 is slightly straighter (that is, has a more relaxed curve) at this point in order for snow to be picked up and rotated forward (which would be difficult if the blade were totally straight). Blade 1, sockets 4 and 5, and braces 7 are formed as an integral unit from molded plastic. Sockets 4 and 5 are each capable of receiving a handle 11. The handle 11 is wooden and has a plastic grip 12 attached to its top end. A wood screw 14 which fits through openings 15 in sockets 4 and 5 and penetrates slightly into the handle 11 holds the handle 11 in position in either socket 4 or socket 5.

Originally, the handle 11 is positioned inside the bottom socket 4 as shown in the FIGURE, and the bottom edge 2 of blade 1 is used to shovel snow. When the bottom edge 2 weras out or is damaged so that it is no longer usable, the person using the shovel unscrews the screw 14 and removes the handle 11 from the bottom socket 4, inserts the handle 11 into the top socket 5 and screws it into position, as shown by the dotted lines (indicating a moved position of handle 11) in the FIGURE, then turns the blade 1 upside-down so that the original top edge 3 is now the bottom edge and can be used for shoveling snow.

I claim:

1. A double shovel comprising:

a blade which has a bottom edge and a top edge, both of which can be used as cutting edges for shoveling snow, such that when said bottom edge is damaged or worn out, said blade can be turned upside-down so that said top edge is now the bottom edge used for shoveling snow, said blade having its width greater than its height and having a generally arcuate curvature;

a handle;

and means for connecting said handle to said blade, said means comprising an assembly formed as a projection from the back of said blade, said assembly comprising a pair of sockets adapted to receive said handle and a pair of braces connecting said sockets, such that said handle is held in position in one of said sockets when said bottom edge of said blade is being used to shovel snow and is held in position in the other one of said sockets when said top edge of said blade is being used to shovel snow.

* * * * *